(12) United States Patent
Anno et al.

(10) Patent No.: US 6,513,372 B2
(45) Date of Patent: Feb. 4, 2003

(54) HIGH SPEED UNIFORMITY MEASUREMENT DEVICE

(75) Inventors: Tsuyoshi Anno, Hamura (JP); Takahiro Gotou, Kodaira (JP); Hiroki Kunitake, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/784,049

(22) Filed: Feb. 16, 2001

(65) Prior Publication Data

US 2001/0015098 A1 Aug. 23, 2001

(30) Foreign Application Priority Data

Feb. 17, 2000 (JP) ........................................ 2000-040168

(51) Int. Cl.[7] .......................... E01G 23/00; G01M 17/02
(52) U.S. Cl. ....................................................... 73/146
(58) Field of Search ........................... 73/7, 8, 146, 669, 73/146.8; 152/209; 364/508, 552; 451/1–5, 254

(56) References Cited

U.S. PATENT DOCUMENTS 5,029,467 A    7/1991   Cargould
5,883,304 A  * 3/1999   Kokubu et al. ................ 73/146
6,065,331 A  * 5/2000   Fukasawa ..................... 73/146

FOREIGN PATENT DOCUMENTS

JP      08-159927      6/1996
WO      WO 98/08070 A1    2/1998

* cited by examiner

Primary Examiner—William Oen
Assistant Examiner—Marissa Ferguson
(74) Attorney, Agent, or Firm—Sughrue Mion, PLLC

(57) ABSTRACT

A high speed uniformity measurement device is provided in which high speed uniformity of a tire conveyed on a production line is measured automatically and continuously. At the high speed uniformity measurement device, a lower spindle is disposed so as to be movable up and down, and a lower side half rim is mounted to a distal end of the lower spindle. An upper spindle is provided, and a sensor for measuring high speed uniformity is provided at the upper spindle. An upper side half rim is mounted to a lower end of the upper spindle. A lock and unlock mechanism, for locking and unlocking the half rim, is formed at an upper side of the lower side half rim and at a lower side of the upper side half rim.

9 Claims, 6 Drawing Sheets

F I G. 1
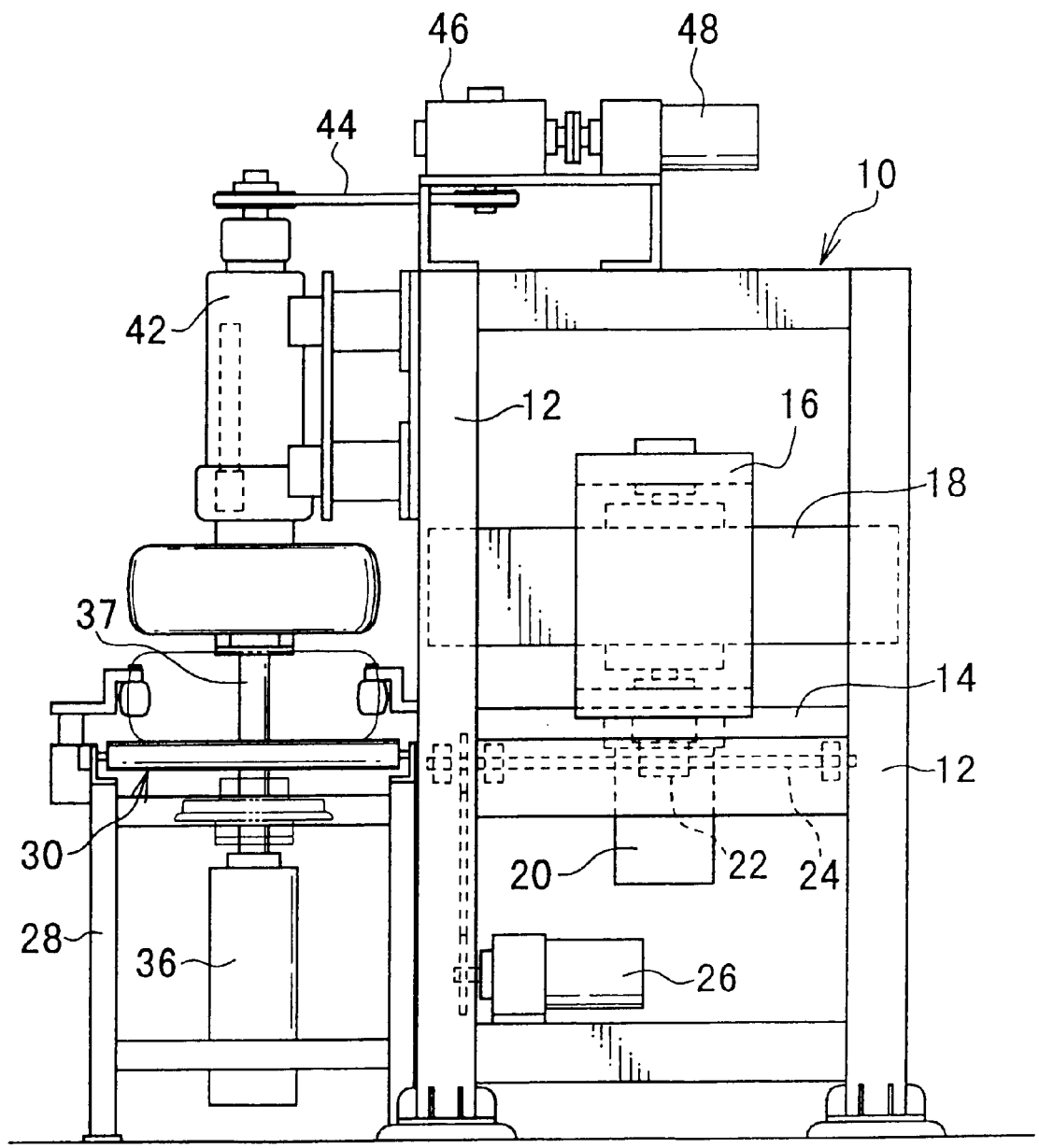

HIGH SPEED UNIFORMITY MEASUREMENT DEVICE

BACKGROUND OF THE INVENTION

1. Field of the Invention

The present invention relates to a high speed uniformity measurement device for a tire. In particular, the present invention relates to a high speed uniformity measurement device for a tire, in which a high speed uniformity of a tire which is conveyed on a production line can be automatically and continuously measured.

2. Description of the Related Art

High speed uniformity, which is a basic characteristic of a product tire, is used for verification of matching data for a vehicle body (suspension) and a tire at a tire manufacturer and an automobile manufacturer.

High speed uniformity is measured by a conventional high speed uniformity measurement device in the following manner: a tire to be measured is mounted on a rim which is being commercially sold, the tire inflated with air is set on a sensor which is on a spindle axis manually by an operator, the tire is pressed by a load drum, and the load drum is rotated at a high speed in a state in which a constant load is applied to the tire.

However, in the conventional high speed uniformity measurement device, it takes time to mount the tire on the rim, inflate the tire with air and set the tire on the measurement device in order to measure the uniformity. Also, it takes time to remove the tire which is set on the measurement device after the measurement is completed. Moreover, it costs much to operate the measurement device, because the operations, for example, mounting the tire on the rim, setting the tire on and removing the tire from the measurement device, running the measurement device and collecting data, are performed manually by the operator. Further, because an internal pressure of the tire changes when the tire is rotated, a long warm up time for the internal pressure of the tire to stabilize is necessary in order to start the measurement.

Accordingly, in the conventional high speed uniformity device, it is very difficult to continuously and automatically measure the high speed uniformity of a tire which is conveyed on a production line.

Moreover, the first order factor of the high speed uniformity is influenced by residual unbalance. Accordingly, not only the high speed uniformity, but also the residual unbalance is measured, and it is necessary that data, in which a measured value of the residual unbalance is removed from a measured value of the high speed uniformity, is evaluated. There are two methods of measurement of the residual unbalance. One method is such that the tire, rotating at a speed which is equal to or more than a target speed, is made to rotate inertially in a non-load condition, and the measurement is performed. The other method is such that a high speed TFV (tangential force variation) of a target speed of the tire is measured in a skim-touch condition (in a condition in which a load, which is applied to the tire when the tire slightly contacts the ground, is applied), and this high speed TFV is used as a substitute value for the residual unbalance. Therefore, it is necessary that, after the high speed uniformity is measured, the tire is rotated again at a high speed in a state in which a load by the load drum is not applied to the tire, the residual unbalance is measured, and data of the results of the measurement of the high speed uniformity is corrected manually. Accordingly, there is the problem that time and costs are required.

On the other hand, a low speed uniformity measurement device has an automatic detachable mechanism by a half rim, and a variation component of the load (a vertical force) of the tire "RFV (radial force variation)" and a variation component of the lateral force of the tire "LFV (lateral force variation)" are measured by a sensor attached to a load drum axis.

One may think that high speed uniformity could be automatically continuously measured by use of the automatic detachable mechanism by the half rim. However, a variation component of a fore-and-aft load of the tire "TFV (tangential force variation)" cannot be measured by a low speed uniformity measurement device because the sensor is attached to the load drum axis. Also, because the low speed uniformity is not influenced by residual unbalance, a mechanism for measuring residual unbalance is not provided at the low speed uniformity measurement device.

Furthermore, when high speed uniformity is measured by the conventional high speed uniformity measurement device, a long time is required for the following reason. In a tire rotating speed increasing period which includes a time from when the tire is not rotated until a rotation speed of the tire reaches a target rotating speed, and in a tire rotating speed decreasing period which includes a time from when the tire rotates at the target rotation speed until the rotation of the tire is stopped, measurement is not performed. Measurement is performed in a state in which the rotation speed of the tire is maintained at a constant high rotation speed.

SUMMARY OF THE INVENTION

The present invention takes the facts mentioned above into consideration, and an object of the present invention is to provide high speed uniformity measurement device for a tire, in which a high speed uniformity of a tire conveyed on a production line can be automatically and continuously measured.

Another object of the present invention is to provide a high speed uniformity measurement device for a tire, in which the high speed uniformity can be measured in a short time.

In order to achieve the object mentioned above, in accordance with a first aspect of the present invention, there is provided a high speed uniformity measurement device comprising: a pair of rim shafts, one rim shaft of the pair of rim shafts being able to be disposed above and another rim shaft of the pair of rim shafts being able to be disposed below a conveyor which conveys a tire such that the pair of rim shafts sandwiches the conveyor, and each rim shaft of the pair of rim shafts is provided with a half rim for sandwiching the tire, and the pair of rim shafts sandwich or release sandwiching of the tire being conveyed on the conveyor; a load drum which is movable in directions of approaching and moving away from the tire, the load drum applying a load to the tire which is sandwiched between the half rims, while the load drum is pushed against the tire and rotates together with the tire; an air filling and releasing portion for filling the tire sandwiched between the half rims with air, and for releasing air from the tire; and a high speed uniformity measuring portion which measures high speed uniformity in a state in which load is applied to the tire which is filled with air and the rotational speed of the tire is varied.

In accordance with the first aspect of the present invention, a pair of rim shafts are disposed above and beneath a conveyor which conveys a tire, so as to sandwich the conveyor. A half rim is provided at each rim shaft. By using the half rims, the pair of rim shafts sandwich the tire which is being conveyed by the conveyor, and release the tire after measurement has been completed, and the tire is put again on the conveyor. A load is applied to the tire which is being sandwiched by the half rim, by a load drum which moves in directions of approaching and moving away from the tire. Further, an air filling and releasing portion fills the tire sandwiched between the half rims with air (inflates the tire with air), and releases the air filled in the tire after measurement has been completed. Then, at the high speed uniformity measuring portion, the high speed uniformity is measured in a state in which load is applied to the tire filled with air and the rotational speed of the tire is varied.

In the first aspect, a mechanism for automatically attaching and releasing the tire by the half rims is provided. Thus, the tire which is being conveyed can be automatically attached and released, and the time required for attaching and releasing the tire for measurement thereof can be reduced. Moreover, because the filling of the tire with compressed air and the releasing of the compressed air from the tire can carried out automatically, the time for measurement can be shortened.

A second aspect of the present invention is a high speed uniformity measurement device according to the first aspect, wherein the high speed uniformity measuring portion measures high speed uniformity in a state in which load is applied to the tire and the rotational speed of the tire is varied in a first direction, and the high speed uniformity measuring portion measures residual unbalance in one of a state in which load is not applied to the tire and the rotational speed of the tire is varied in a second direction which is different than the first direction, or a state in which the load is applied to the tire right before the tire contacts ground, and the rotational speed of the tire is varied in the second direction, and a first order component of high speed uniformity is determined on the basis of subtracting a measured value of residual unbalance from a measured value of high speed uniformity.

In the second aspect, the high speed uniformity is measured in a state in which load is applied to the tire which is filled with air and the rotational speed of the tire is varied in a first direction (the raising direction or the lowering direction). The first order component of the high speed uniformity is affected by the residual unbalance. Thus, separately from the high speed uniformity, the residual unbalance is measured in one of the following two states: (1) a state in which no load is applied to the tire and the rotational speed of the tire is varied in a second direction (the lowering direction if the first direction is the raising (increasing) direction, or the raising direction if the first direction is the lowering direction), or (2) a state in which a load is applied to the tire, which load is equal to the load which is applied to the tire immediately before the tire contacts the ground, and the rotational speed of the tire is varied in the second direction. Then, by subtracting the measured value of the residual unbalance from the measured value of the high speed uniformity, the first order component of the high speed uniformity is determined.

In a case in which the first order component of the high speed uniformity is determined, when an attempt is made to measure the high speed uniformity and the residual unbalance within one cycle in which the tire rotational speed is raised and then lowered, a measurement timing cannot be achieved. Therefore, the high speed uniformity and the residual unbalance at a predetermined rotational speed within a measurement speed range are measured.

Further, given that the unbalance m on the tire circumference rotates at a tire rolling radius r and an angular speed $\omega$, the residual unbalance can generally be expressed as $mr\omega^2$. The relationship between the rotational speed of the tire and the residual unbalance can substantially be expressed as a second order regression curve. Here, based on the high speed uniformity at an arbitrary rotational speed, the residual unbalance corresponding to this arbitrary rotational speed is estimated from the second order regression curve. The residual unbalance corresponding to the arbitrary rotational speed is vector subtracted from the high speed uniformity of the arbitrary rotational speed. Accordingly, a first order component of the high speed uniformity which has been corrected by the residual unbalance can be determined.

In the second aspect of the present invention, the high speed uniformity of the tire is measured in a state in which the rotational speed of the tire is varied in a first direction, and the residual unbalance is measured in a state in which the rotational speed of the tire is varied in a second direction. Therefore, the high speed uniformity and the residual unbalance can be measured within the period of time in which the tire rotates from the stopped state and then again returns to the stopped state. There is no need to maintain the rotational speed of the tire constant each time a predetermined rotational speed is reached. Thus, the first order component of the high speed uniformity of the tire can be determined in a short time.

A third aspect of the present invention is a high speed uniformity measurement device according to the first aspect, wherein the high speed uniformity measuring portion is provided at a position other than at the load drum.

A fourth aspect of the present invention is a high speed uniformity measurement device according to the third aspect, wherein the high speed uniformity measuring portion is provided at the pair of rim shafts.

A fifth aspect of the present invention is a high speed uniformity measurement device according to the second aspect, wherein the high speed uniformity measuring portion determines the first order component of the high speed uniformity by determining a relationship between a rotational speed of the tire and residual unbalance, and subtracting, from the measured value of the high speed uniformity at a predetermined tire rotational speed, a residual unbalance at the predetermined tire rotational speed which residual unbalance is estimated on the basis of the relationship.

A sixth aspect of the present invention is a high speed uniformity measurement device according to the first aspect, wherein the high speed uniformity measuring portion measures high speed uniformity in a state in which load is applied to the tire and the rotational speed of the tire is varied, and at least one of high order components of the high speed uniformity is determined.

BRIEF DESCRIPTION OF THE DRAWINGS

FIG. 1 is a side view of a high speed uniformity measurement device of an embodiment of the present invention.

DESCRIPTION OF THE PREFERRED EMBODIMENT

Figure 2:
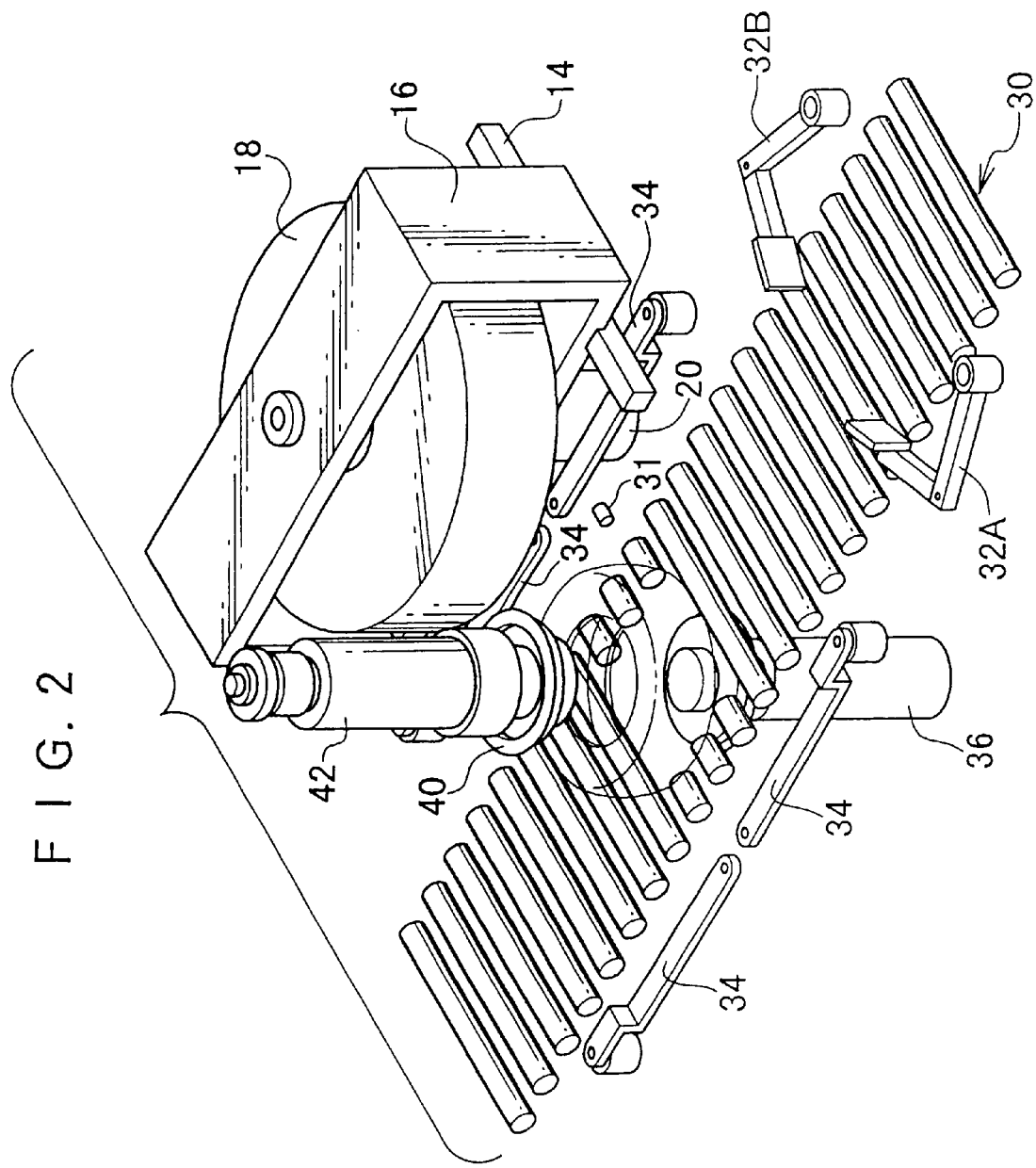
FIG. 2 is a perspective view illustrating a measuring portion of the high speed uniformity measurement device of the embodiment of the present invention.

A detailed description will be given below of an embodiment of the high speed uniformity measurement device in accordance with the present invention with reference to the figures. As illustrated in FIG. 1, a pair of rails 14, which extend parallel in a horizontal direction, bridge between substantially central portions of support legs 12 of a rectangular frame body 10. A support frame 16, in a bottom face of which a pair of groove portions for engaging with the rails are formed, is engaged with the rails 14 at the groove portions. The support frame 16 is thereby movable along the rails 14. As illustrated in FIG. 2, a load drum 18, which has a flat cylindrical configuration and at which a rotational shaft is provided, is supported at the support frame 16, so as to be rotatable about the rotational shaft extending in a vertical direction. A motor 20 for rotating the load drum 18 is connected to a lower portion of the rotational shaft of the load drum 18.

A block 22, in whose central portion a female screw is formed, is fixed at a substantially central portion of the bottom face of the support frame 16. A screw bar 24, which is rotatably attached to the rectangular frame 10 in such a manner that the screw bar 24 bridges across the rectangular frame 10 and is parallel to the rails 14, is screwed to the block 22. A pulley is fixed to one end portion of the screw bar 24. The pulley is connected to a rotational shaft of the motor 26 via a belt. The block 22, the screw bar 24 and the motor 26 form a moving mechanism for moving the load drum 18 in a horizontal direction along the rails 14. The support frame 16, the load drum 18 and the motor 20 can be integrally moved in the horizontal direction, namely, in directions in which the support frame 16, the load drum 18 and the motor 20 approach or move away from a tire to be measured, by rotating the motor 26.

A roller conveyor 30 is disposed at a side portion of the rectangular frame body 10. The roller conveyor 30 is structured such that many conveying rollers are rotatably supported on a top portion of the support frame 28 in such a manner that the conveying rollers are disposed in parallel with each other in a horizontal plane. The conveying rollers are rotated by a motor (not shown in the drawings), and the roller conveyor 30 conveys the tire.

In a portion of the roller conveyor 30 in a longitudinal direction thereof, shorter length conveying rollers are disposed in such a manner that each of the shorter length conveying rollers, which is disposed at one side of the roller conveyor 30 in a transverse direction thereof, faces shorter length conveying rollers disposed at the other side of the roller conveyor 30 in the transverse direction thereof. The shorter length conveying rollers thereby form a pass-through space for a lower half rim between the shorter length conveying rollers disposed at the one side and the shorter length conveying rollers disposed at the other side. A centering mechanism is disposed at a position which is at the upstream side of the pass-through space for a lower half rim. The centering mechanism comprises a stopper arm 32A and a centering arm 32B. The stopper arm 32A is fixedly disposed. The centering arm 32B is always urged in a direction toward the stopper arm 32A and is swingably disposed. The stopper arm 32A and the centering arm 32B are disposed such that the roller conveyor 30 is located between them. The tire conveyed by the roller conveyor 30 is stopped by the stopper arm 32A, and the tire is moved to a central position of the roller conveyor 30 in the transverse direction thereof by the stopper arm 32A and the centering arm 32B. Therefore, the tire is positioned such that the tire is conveyed at a central position of the roller conveyor 30 in the transverse direction thereof.

A tire pass through sensor 31, which is formed by a light emitting element and a light receiving element and which is for detecting the tire passing through in front of the sensor, is provided at a position which is at the upstream side of the pass through space for a lower half rim. Four positioning arms 34 are swingably provided at positions around the pass-through space for a lower half rim. Namely, two positioning arms of four positioning arms 34 are disposed at a left position and a right position of an upstream portion with respect to the pass through space for a lower half rim. The two other positioning arms of the four positioning arms 34 are disposed at a left position and a right position of a downstream portion with respect to the pass through space for a lower half rim. In this way, the four positioning arms 34 can grasp the tire from four directions and can position the tire onto the pass-through space for a lower half rim. The positioning arms 34 are connected to a rotational shaft of a motor (not shown in the drawings), and the positioning arms 34 are driven so as to grasp the tire from four directions at the time when the tire pass through sensor 31 detects that a tire is passing in front of the sensor.

At the lower side of the pass-through space for a lower half rim, a lower spindle 37 is disposed. The lower spindle 37 is movable in vertical directions by a hydraulic cylinder 36. A lower half rim 38 is attached to the distal end of the lower spindle 37 via a first lock and unlock mechanism. The hydraulic cylinder 36 is connected to a hydraulic pressure generating device via a hydraulic piping (not shown in the drawings). The hydraulic pressure generating device is connected to a solenoid valve connected to an air supply. The amount of generated hydraulic pressure is controlled by switching the solenoid valve.

At the upper side of the pass-through space for a lower half rim, an upper spindle 42 is disposed. The upper spindle 42 is axially supported by a spindle bearing. The spindle bearing of the upper spindle 42 is rotatably supported at a side surface of the support legs 12 of the rectangular frame body 10 by two arms. A top end of the upper spindle 42 is coupled to a rotational shaft of a spindle motor 48 fixed to a top portion of the rectangular frame body 10 via belt 44 and gear box 46.

Figure 3:
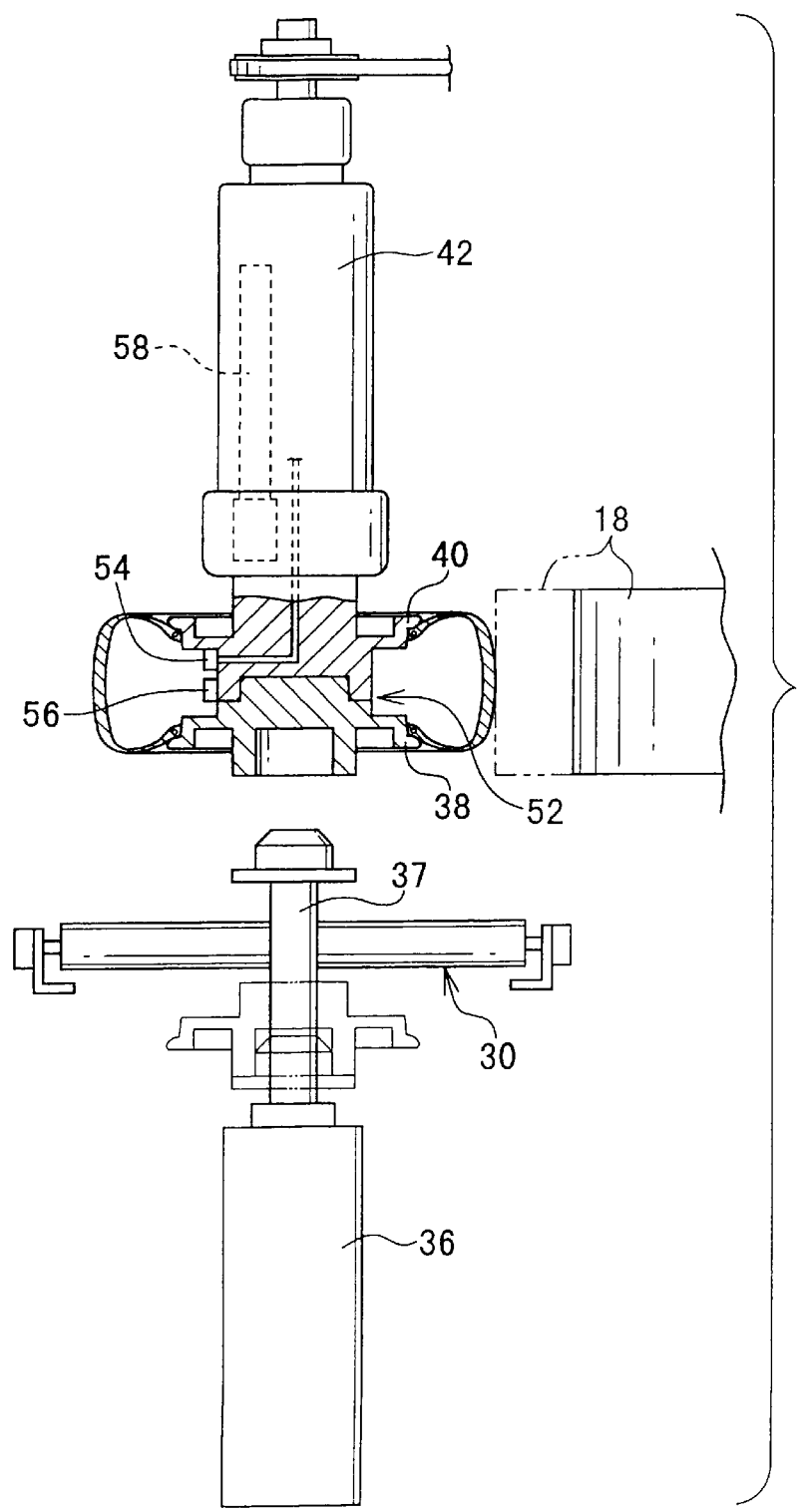
FIG. 3 is a side view illustrating the measuring portion of the high speed uniformity measurement device of the embodiment of the present invention.

Also, an upper half rim 40 is fixed to a lower end of the upper spindle 42. As shown in FIG. 3, at an upper side of the lower half rim 38 and at a lower side of the upper half rim 40, a second lock and unlock mechanism 52 for locking and unlocking the lower half rim 38 and the upper half rim 40 is formed.

At the side surface of the second lock and unlock mechanism 52, a solenoid valve 54 and a pressure sensor 56 are provided. The solenoid valve 54 is used to charge air into the tire and to discharge the air from the tire. The pressure sensor 56 detects an internal pressure of the tire. The solenoid valve 54 is connected to the air supply (not shown in the drawings) via the piping.

Also, a measurement sensor 58 comprising a three component force type sensor 58A, an encoder 58B and a load cell 58C, is built in the upper spindle 42. The three component force type sensor 58A detects variations of forces in three directions of the x axis, the y axis and the z axis (in vertical directions, fore-and-aft directions, and left and right directions of the tire) and moments around each axis. The encoder 58B outputs one pulse for every one rotation of the upper spindle 42. The load cell 58C measures a pressed-force which acts on the tire when the load drum is pressed against the tire. A tire vertical axis force Fx, a tire fore-and-aft axis force Fy and a tire left and right axis force Fz can be detected by the three component force type sensor 58A. A measurement timing, a rotation speed of the tire, and a rotation speed of the load drum in a state in which the load drum contacts the tire and rotates, can be detected by the pulse outputted from the encoder 58B. The sensor can be built in the lower spindle in the same way.

Figure 4:
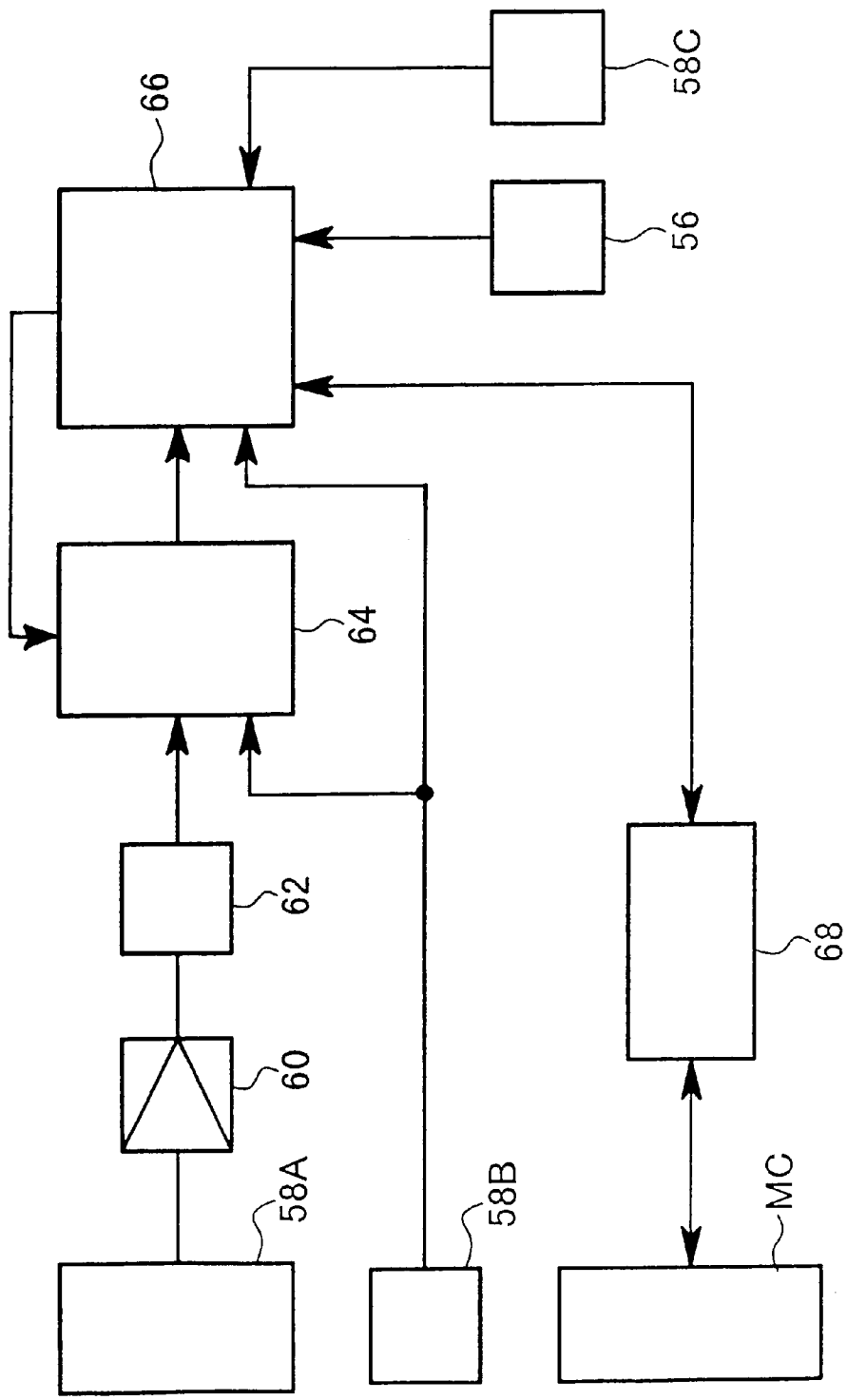
FIG. 4 is a block diagram of a computing portion of the high speed uniformity measurement device of the embodiment of the present invention.
Figure 5:
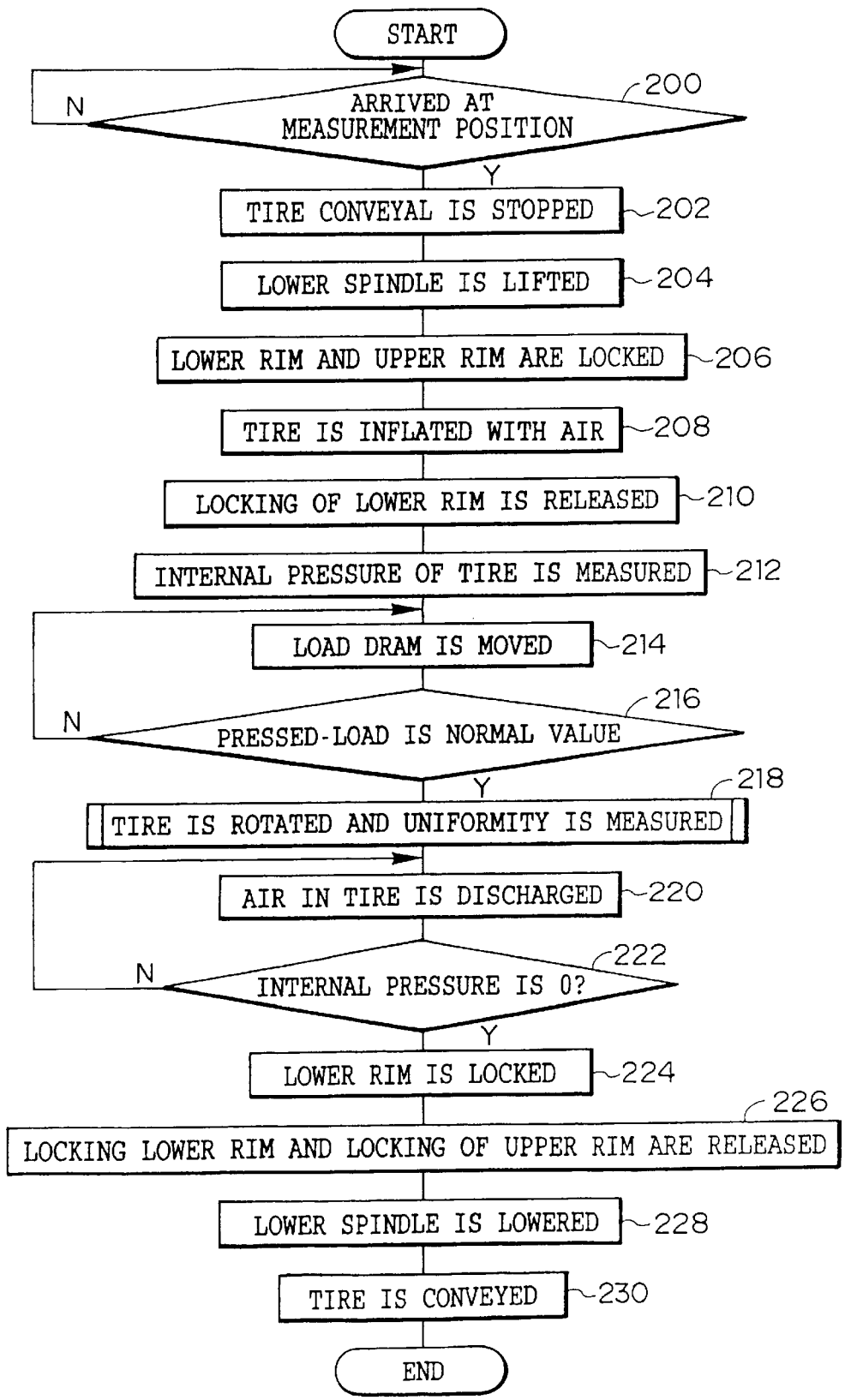
FIG. 5 is a flowchart of a high speed uniformity measurement control routine carried out at the high speed uniformity measurement device of the embodiment of the present invention.

As shown in FIG. 4, the three component force type sensor 58A of the measurement sensor 58 is connected to a high speed Fourier transformation (FFT) analyzer 64 via a pre-amplifier 60 and filter 62. The encoder 58B is connected to the FFT analyzer 64. The FFT analyzer 64 is connected to a personal computer 66. Timing of the Fourier transformation is controlled by the personal computer 66, and the results of the Fourier transformation are inputted to the personal computer 66.

Also, sections MC to be controlled of the solenoid valve, which controls the hydraulic pressure, the first lock and unlock mechanism, the second lock and unlock mechanism 52, the motors 20, 26, 36, the spindle motor 48, and solenoid valve 54, and the like, are connected to the personal computer 66 via a sequence control unit 68. Also, the pressure sensor 56 which detects the internal pressure of the tire, the encoder 58B and the load cell 58C which detects the pressed-force of the tire, are connected to the personal computer 66.

Hereinafter, operation of an embodiment of the present invention is explained. The tire is positioned in the central portion of the roller conveyer 30 by the stopper arm 32A and the centering arm 32B. When the tire, which is conveyed by the roller conveyer 30, is detected by the tire pass through sensor 31, it is judged that the tire has arrived at the measurement position in step 200. In step 202, the four positioning arms 34 are driven to grasp the tire, and the tire is stopped in the pass-through space for a lower half rim.

In step 204, the lower spindle 37 is lifted by controlling the hydraulic cylinder 36. At this time, the lower half rim 38 is locked on the distal end of the lower spindle 37 due to the first lock and unlock mechanism. Accordingly, the lower half rim 38 is lifted in accordance with the rising of the lower spindle 37. Therefore, the lower spindle 37 rises up to the upper spindle 42 to which the upper half rim 40 is attached, in a state in which the tire is mounted on the lower half rim 38. At this time, the lower spindle 37 is stopped at a position which ensures a rim width determined by standards in advance. The tire is thereby sandwiched between the lower half rim 38 and the upper half rim 40.

In next step 206, the lower half rim 38 and the upper half rim 40 are locked by controlling the second lock and unlock mechanism 52. In step 208, the tire is inflated with air by controlling the solenoid valve 54, the signal from the pressure sensor 56 is fetched, and the internal pressure of the tire is controlled such that the internal pressure becomes the predetermined normal pressure. When the internal pressure becomes the predetermined pressure, in step 210, locking of the lower spindle and the lower half rim is released in order to make the lower half rim free with respect to the lower spindle. Accordingly, the tire, with the lower half rim 38 and the upper half rim 40, becomes rotatable.

After the internal pressure of the tire is checked in step 212, in step 214, the motor 26 is rotated, the load drum 18 is moved toward the tire, the load drum is pressed against the tire which is inflated with air such that the pressed-force is applied to the tire. In step 216, it is judged whether or not the pressed-force has reached the predetermined normal value, on the basis of the output from the load cell 58C built in the measurement sensor 58. When it is judged that the pressed-force has reached the predetermined normal value, the routine proceeds to step 218. In step 218, the tire is rotated at a high speed by the load drum 18 or the spindle motor 48. During the time when the tire is rotated at a predetermined rotation speed, the signal detected by the three component force type sensor 58A is processed by the computer, and the high speed uniformity is measured. After the measurement of the high speed uniformity is completed, the load drum is moved back such that the load drum is moved to a waiting position thereof. While the tire still rotates, the residual unbalance is measured in a state in which the pressed load against the tire is 0. The measured data of the high speed uniformity is automatically corrected by the measured unbalance measurement value so as to obtain the measured value of the first order component. Details of the measurement of the high speed uniformity will be described later.

Next, the amount of the calculated high speed uniformity (for example, the amount of the first order component) is compared with the reference value. If the amount of the calculated high speed uniformity of the tire is more than or equal to the reference value, a marking is added to a portion to be corrected, and the tire is conveyed in order to be corrected at another line. Or, if the amount of the calculated high speed uniformity of the tire is more than or equal to the reference value, the tire is conveyed after the uniformity of the tire is corrected by a grinder mechanism (not shown in the drawings). Such methods of conveying the tire are described later.

When the measurement of all measurement values is completed, the rotation of the tire is stopped, and in step 220, the air in the tire is discharged by controlling the solenoid sensor in the upper spindle. In this case, the spindle motor may be omitted. Or, in the case of driving the spindle motor, the motor for driving the load drum may be omitted.

As mentioned above, in a state in which load is applied to the tire by the tire being pressed by a side surface of the load drum 18 at a predetermined pressure, in step 102, rotation of the load drum is started. The rotational speed of the load drum 18 is increased at a fixed rate by controlling the motor 20 on the basis of the output of the encoder 58B, such that the rotational speed of the tire is increased up to a predetermined rotational speed at a fixed rate.

In step 104, on the basis of the output of the encoder 58B, it is judged whether or not a predetermined time for measurement has been reached, by judging whether or not the rotational speed of the tire is increased up to the predetermined rotational speed. When it is judged that it is the predetermined time for measurement has been reached, in step 106, the FFT analyzer 64 is controlled such that the output of the three component force type sensor 58A is inputted to the FFT analyzer 64 via the pre-amplifier 60 and the filter 62, and the inputted data is subject to high speed Fourier transformation. The high speed uniformity is measured by the FFT analyzer 64 calculating an amplitude corresponding to the first order component of the high speed uniformity, which corresponds to the rotational speed at the time for measurement, from the output of the three component valve 54. In step 222, it is judged whether or not the internal pressure of the tire is 0 on the basis of the output of the pressure sensor 56. If it is judged that the internal pressure of the tire is 0, in step 224, the lower half rim is locked to the lower spindle. In step 226, the locking of the lower half rim and the upper half rim is released by controlling the second lock and unlock mechanism.

After the locking of the lower half rim and the upper half rim is released, in step 228, the lower spindle is lowered. Namely, the lower spindle is lowered in a state in which the tire is mounted on the lower half rim. When the lower spindle passes through the lower spindle pass through space, the tire abuts the conveying rollers and the tire is released from the lower half rim. The released tire is conveyed in the downstream direction by the roller conveyer 30.

By successively performing the above described operation, it becomes possible for the high speed uniformity to be measured successively and automatically, and processes to be performed after measurement can be carried out automatically.

Figure 6:
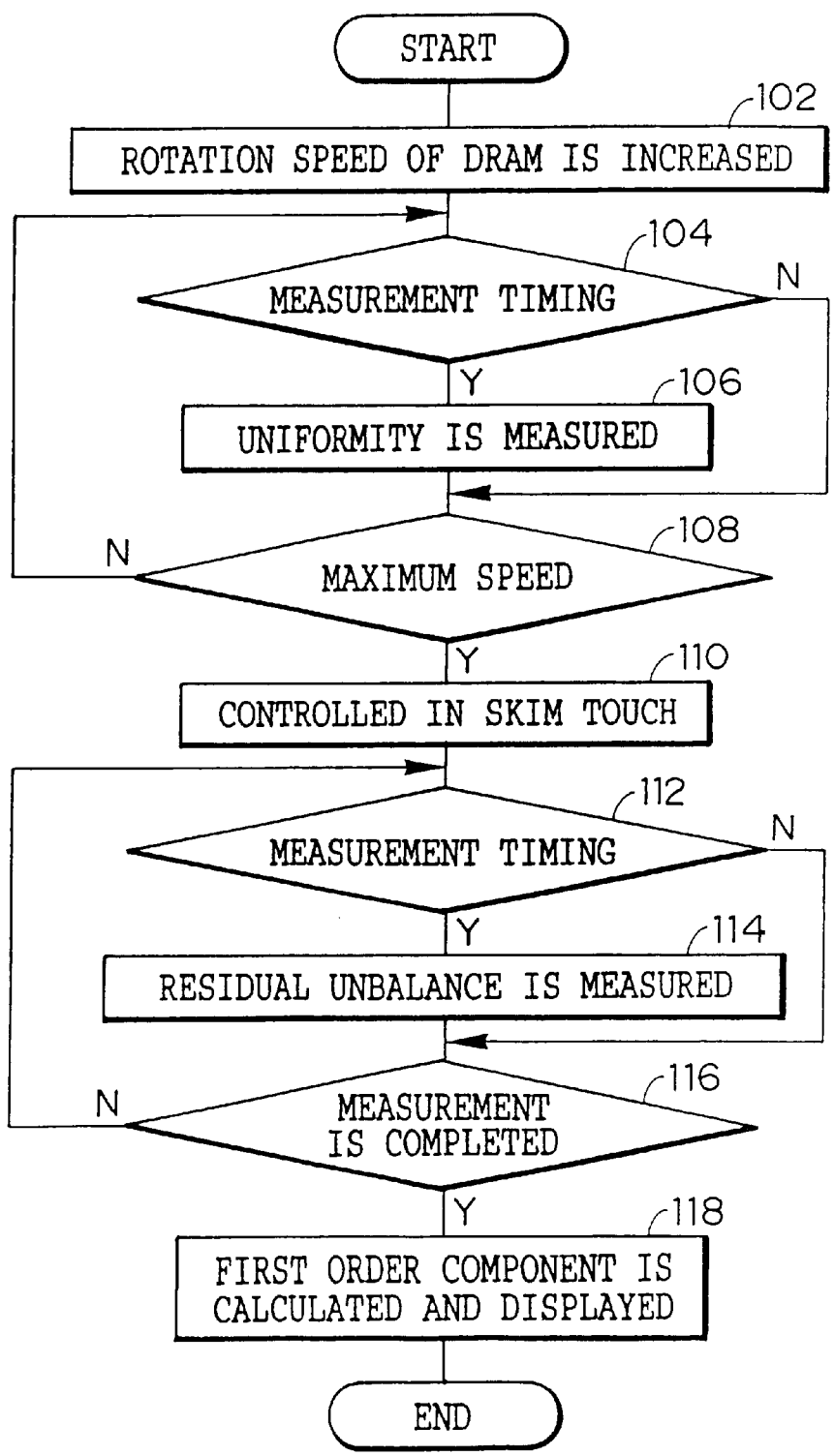
FIG. 6 is a flowchart showing details of the high speed uniformity measurement of FIG. 5.

Next, details of the high speed uniformity measurement method in a step 218 are explained with reference to FIG. 6. Hereinafter, a case is explained in which the tire is driven to rotate by driving the load drum, and the first order component and respective high order components of the high speed uniformity are measured by the three component force type force type sensor 58A. The FFT analyzer 64 also calculates a phase corresponding to this first order component on the basis of the pulse outputted from the encoder 58B.

Tracking analysis can be performed by use of this pulse. This pulse does not have to be a pulse in which one pulse corresponds to one rotation. If the one pulse corresponds to more than one rotation, accuracy of measurement increases. More over, one pulse may be multiplied by several tens of pulse.

In step 108, it is judged whether or not the tire rotational speed has reached the predetermined maximum speed on the basis of the output of the encoder 58B. (The predetermined maximum speed is more than 60 rpm.) If the tire rotational speed has not reached the predetermined maximum speed, the above mentioned measurement is repeated every time a predetermined rotational speed of the tire is reached. When the tire rotational speed reaches the predetermined maximum speed, measurement of high speed uniformity is completed. As described above, measurement of the high speed uniformity can be performed every time a predetermined rotational speed of the tire is reached, such that the high speed uniformity is measured each time when the rotational speed of the tire is increased by the predetermined rotational speed.

After the measurement of the high speed uniformity is completed, a load, which load is applied to the tire just before the tire contacts the ground, is applied to the tire by controlling the motor 26 such that the tire skim-touches the side surface of the load drum. Also, the rotational speed of the drum is decreased at a fixed rate by motor 20 being regeneratively rotated. The skim-touched state is automatically controlled by the output of the load cell 58C. The rotational speed may be decreased inertially.

In step 112, in a state in which the load, which is applied to the tire just before the tire contacts the ground, is applied to the tire, it is judged whether or not it is the time for measurement by judging whether or not the rotational speed has become a predetermined rotational speed (or frequency). If it is judged that it is the time for measurement, in step 114, the phase and the amplitude of the residual unbalance are measured by the output of the three component force type sensor being subject to high speed Fourier transformation on the basis of the pulse outputted from the encoder 58B by use of the FFT analyzer 64. This measurement of the residual unbalance is performed until it is judged that measurement has been completed in step 116. Therefore, the residual unbalance is measured each time a predetermined rotational speed of the tire is reached (or, each time a predetermined frequency).

In step 116, when it is judged that the measurement of the residual unbalance is completed, in step 118, a second order regression curve which shows the relationship between the measurement value of the residual unbalance and the rotational speed of the tire is estimated, from the measurement value of the residual unbalance and the rotational speed of the tire when the residual unbalance is measured. The respective residual unbalances, which correspond to the respective rotational speeds at which the high speed uniformity is measured, are estimated from the obtained second order regression curve. Next, the corresponding residual unbalance is vector subtracted from the high speed uniformity for each rotational speed. In this way, the first order component of the high speed uniformity which is corrected by the residual unbalance is computed. Then, the high speed uniformity corresponding to a predetermined rotational speed is calculated by interpolation from a plurality of values of high speed uniformities after residual unbalance correction for each of predetermined rotational speeds determined within a measured speed range. The computed first order component of the high speed uniformity is displayed on a liquid crystal display device (not shown in the drawings) or the like.

In the above description, an example was described in which the residual unbalance is measured in a skim touch state, i.e., in a state in which a load immediately before the tire contacts the ground is applied to the tire. However, residual unbalance may be measured in a state in which the tire is separated from the load drum such that the tire and the load drum are in a non-contact state, i.e., a state in which the tire is in an unloaded state and the rotational speed of the tire is reduced due to inertia, or a state in which the spindle motor 48 is regeneratively rotated. Note that when the tire rotates due to inertia, it takes more time for the tire to stop rotating than a state in which, while the rotational speed of the drum is lowered in the skim touch state, the tire lowered speed is controlled. Thus, it is preferable to carry out measurement in the skim touch state or in a state in which the spindle motor is regeneratively driven.

Further, in the above description, a case was described in which the high speed uniformity is measured while the rotational speed of the tire is being raised, and the residual unbalance is measured while the rotational speed is being lowered. However, conversely, the residual unbalance may be measured in the skim touch state while the rotational speed is being raised, and the high speed uniformity may be measured while the rotational speed is being lowered.

Next, a measurement method for measuring high speed uniformity will be described in which the tire is rotated by the spindle motor 48, and the axial force of the tire is detected by a three component force type sensor of the upper side spindle. In this case, the motor which rotates the load drum can be omitted.

First, in the same way as described above, the load drum is pushed against the tire. In a state in which a load is applied to the tire, the rotational speed of the tire is raised by the spindle motor 48, and while the speed is being raised, the high speed uniformity is measured at each predetermined rotational speed.

When the rotational speed reaches a maximum speed, the load drum is separated from the tire. The tire is set in an unloaded state, and while the rotational speed of the tire drops due to inertia, the residual unbalance is measured for each predetermined rotational speed as described above. In this case, the tire is driven by the spindle motor which is coupled to the tire axis. Thus, even with the tire in an unloaded state, the falling rotational speed of the tire can be controlled by the regenerative driving of the spindle motor.

A case is described above in which, in a method for measurement of the high speed uniformity by rotating/driving a tire by a spindle motor, the high speed uniformity is measured at the time the rotational speed is increased, and the residual unbalance is measured at the time the rotational speed is reduced. However, in this case as well, in the same way as described above, the residual unbalance may be measured at the time the rotational speed is raised, and the high speed uniformity may be measured at the time the rotational speed is reduced. However, in a case in which the high speed uniformity is measured, the tire which is rotating at maximum speed is made to contact the load drum which is stopped and the tire is in a loaded state. Thus, the frictional force of the tire increases greatly, and there is the fear that the tire may be damaged. In order to overcome this problem, at the time of raising the speed, the residual unbalance is measured while the load drum is being rotated in a skim touch state. When the load drum and the tire are rotated at the same maximum speed, the load is applied to the tire, and the high speed uniformity is measured.

In the above explanation, an example is described in which the first order component of the high speed uniformity is measured. However, high order components of the high speed uniformity may be measured during the time the rotational speed is raised or during the time the rotational speed falls. When the high order components are measured, in the same way as in the case when the first order component is measured, a measuring timing for the high speed uniformity within one cycle of rising rotational speed or falling rotational speed cannot be achieved. However, because high order components are not affected by the residual unbalance, there is no need to measure the residual unbalance, and the high speed uniformity value can be used as it is without being corrected.

Further, in a case in which there is a resonance peak due to the tire eigenvalue, if the peak value of the amplitude in the measurement rotational speed range is determined, it can be confirmed by experimentation that the correspondence with actual phenomena is good. Thus, the tire eigenvalue can be easily measured.

As described above, in the high speed uniformity measuring device of the present embodiment, there is no need to maintain the rotating speed of the tire constant. Thus, the high speed uniformity, or the high speed uniformity and the residual unbalance can be efficiently measured in a short period of time.

Further, because measurement can be carried out in a state in which the rotational speed is varied, the high order components can be evaluated at peak values, and the tire eigenvalue during running of the tire can be estimated from the peak value. Further, measurement of an arbitrary speed or an arbitrary order of the component can be carried out, and regenerative braking during lowering of the rotational speed can be utilized. Thus, the present embodiment is suitable for a high speed uniformity measuring device on an assembly line used in differentiating tires.

Moreover, a tire attaching/removing mechanism by the half-rims is provided. Thus, a tire which is being conveyed by a conveyor can be automatically attached and removed. Running of a measuring device, collection of data, judging of the results of measurement, and marking of the tire can be carried out automatically. In this way, there is no need for manual labor, and time can be shortened.

Because a tire internal pressure control mechanism is provided, the warming up time for stabilizing the internal pressure can be shortened. The residual unbalance with the load at zero during uniformity measurement can be measured. Thus, the time for moving to residual unbalance measurement, which was carried out separately from uniformity in the conventional art, can be shortened.

Because a three component force type sensor is attached to the spindle bearing side, RFV, TFV which are needed for high speed uniformity measurement can be measured.

In accordance with the present embodiment, the time required for measuring the high speed uniformity of a manufactured tire, which was 30 minutes per tire in the conventional art, can be shortened to $1/10$ of the tire required in the conventional art. Moreover, because measurement is carried out completely automatically, there is no need for manual labor.

As described above, in accordance with the first aspect of the invention, the high speed uniformity of a tire or the like which is being conveyed on a production line can be automatically and continuously measured.

In accordance with the second aspect of the present invention, in a state in which the rotational speed of the tire is varied in a first direction, the tire high speed uniformity is measured. In a state in which the rotational speed of the tire is varied in a second direction, the residual unbalance is measured. Measurement is carried out during a period of time during which the tire is rotated from a stopped state and then returns to the stopped state. Thus, there is no need to maintain the rotational speed of the tire constant, and the first order component of the high speed uniformity of the tire can be measured in a short period of time.

What is claimed is:

1. A high speed uniformity measurement device comprising:

a pair of rim shafts, one rim shaft of the pair of rim shafts being able to be disposed above and another rim shaft of the pair of rim shafts being able to be disposed below a conveyor which conveys a tire such that the pair of rim shafts sandwiches the conveyor, and each rim shaft of the pair of rim shafts is provided with a half rim for sandwiching the tire, and the pair of rim shafts sandwich or release sandwiching of the tire being conveyed on the conveyor;

a load drum which is movable in directions of approaching and moving away from the tire, the load drum applying a load to the tire which is sandwiched between the half rims, while the load drum is pushed against the tire and rotates together with the tire;

an air filling and releasing portion for filling the tire sandwiched between the half rims with air, and for releasing air from the tire; and a high speed uniformity measuring portion which measures high speed uniformity in a state in which load is applied to the tire which is filled with air and the rotational speed of the tire is varied.

2. A high speed uniformity measurement device according to claim 1, wherein the high speed uniformity measuring portion measures high speed uniformity in a state in which load is applied to the tire and the rotational speed of the tire is varied in a first direction, and the high speed uniformity measuring portion measures residual unbalance in one of a state in which load is not applied to the tire and the rotational speed of the tire is varied in a second direction which is different than the first direction, or a state in which the load is applied to the tire right before the tire contacts ground, and the rotational speed of the tire is varied in the second direction, and a first order component of high speed uniformity is determined on the basis of subtracting a measured value of residual unbalance from a measured value of high speed uniformity.

3. A high speed uniformity measurement device according to claim 1, wherein the high speed uniformity measuring portion is provided at a position other than at the load drum.

4. A high speed uniformity measurement device according to claim 3, wherein the high speed uniformity measuring portion is provided at the pair of rim shafts.

5. A high speed uniformity measurement device according to claim 2, wherein the high speed uniformity measuring portion determines the first order component of the high speed uniformity by determining a relationship between a rotational speed of the tire and residual unbalance, and subtracting, from the measured value of the high speed uniformity at a predetermined tire rotational speed, a residual unbalance at the predetermined tire rotational speed which residual unbalance is estimated on the basis of the relationship.

6. A high speed uniformity measurement device according to claim 2, wherein the high speed uniformity measuring portion measures high speed uniformity in a state in which load is applied to the tire and the rotational speed of the tire is varied, and at least one of high order components of the high speed uniformity is determined.

7. A high speed uniformity measurement device comprising:
  a pair of rim shafts, one rim shaft of the pair of rim shafts being able to be disposed above and another rim shaft of the pair of rim shafts being able to be disposed below a conveyor which conveys a tire such that the pair of rim shafts sandwiches the conveyor, and each rim shaft of the pair of rim shafts is provided with a half rim for sandwiching the tire, and the pair of rim shafts sandwich or release sandwiching of the tire being conveyed on the conveyor;
  a load drum which is movable in directions of approaching and moving away from the tire, the load drum applying a load to the tire which is sandwiched between the half rims, while the load drum is pushed against the tire and rotates together with the tire;
  an air filling and releasing portion for filling the tire sandwiched between the half rims with air, and for releasing air from the tire; and
  a high speed uniformity measuring portion which, during a cycle in which a rotational speed of the tire is increased up to a predetermined rotational speed from a stationary state of the tire, and thereafter the rotational speed of the tire is decreased to the stationary state, (1) measures high speed uniformity of the tire in a state in which the rotational speed of the tire is varied in a first direction, and (2) measures residual unbalance in a state in which the rotational speed of the tire is varied in a second direction opposite to the first direction.

8. A high speed uniformity measurement device according to claim 7, wherein, when the tire reaches a plurality of rotational speeds while the rotational speed of the tire is varied in the first direction, each high speed uniformity corresponding to the respective rotational speeds is measured; and
  when the tire reaches a plurality of rotational speeds while the rotational speed of the tire is varied in the second direction, each residual unbalance corresponding to the respective rotational speeds is measured.

9. A high speed uniformity measurement device comprising:
  a pair of rim shafts, one rim shaft of the pair of rim shafts being able to be disposed above and another rim shaft of the pair of rim shafts being able to be disposed below a conveyor which conveys a tire such that the pair of rim shafts sandwiches the conveyor and each rim shaft of the pair of rim shafts is provided with a half rim for sandwiching the tire, and the pair of rim shafts sandwich or release sandwiching of the tire being conveyed on the conveyor;
  a load drum which is movable in directions of approaching and moving away from the tire, the load drum applying a load to the tire which is sandwiched between the half rims, while the load drum is pushed against the tire and rotates together with the tire;
  an air filling and releasing portion for filling the tire sandwiched between the half rims with air, and for releasing air from the tire; and
  a high speed uniformity measuring portion which measures high speed uniformity in a state in which load is applied to the tire and the rotational speed of the tire is varied in a first direction, and which measures residual unbalance in one of a state in which load is not applied to the tire and the rotational speed of the tire is varied in a second direction which is different than the first direction, or a state in which the load is applied to the tire in a skim-touch condition and the rotational speed of the tire is varied in the second direction, a first order component of high speed uniformity being determined on the basis of subtracting a measured value of residual unbalance from a measured value of high speed uniformity,
  wherein the high speed uniformity measuring portion measures the high speed uniformity and the residual unbalance during a cycle in which the rotational speed of the tire is increased up to a predetermined rotational speed from a stationary state of the tire, and thereafter the rotational speed of the tire is decreased to the stationary state.

* * * * *